Jan. 28, 1930.  R. E. L. BINION  1,744,737
CANE STRIPPING MACHINE
Filed Oct. 11, 1924   3 Sheets-Sheet 2
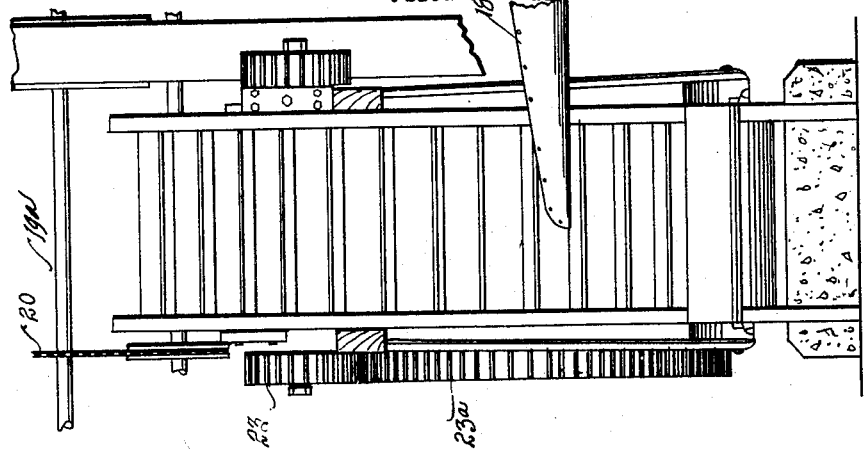
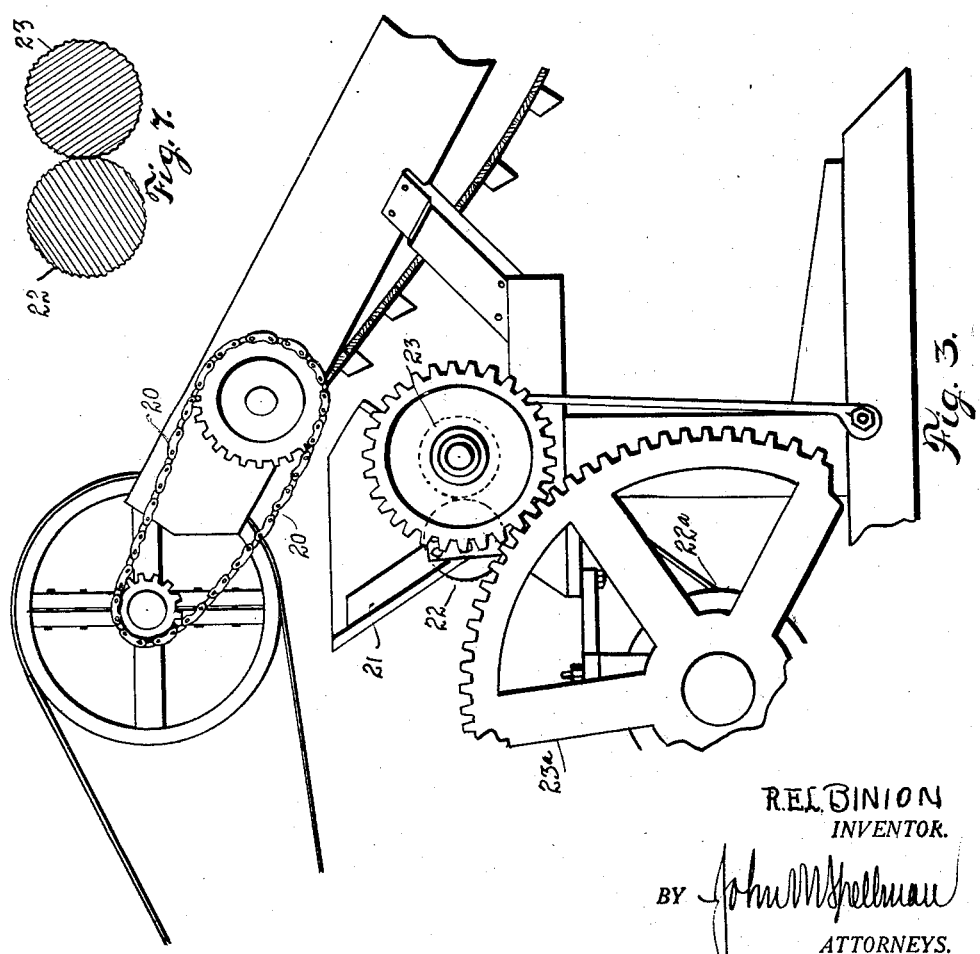
R.E.L.BINION
INVENTOR.
BY *John M Spellman*
ATTORNEYS.

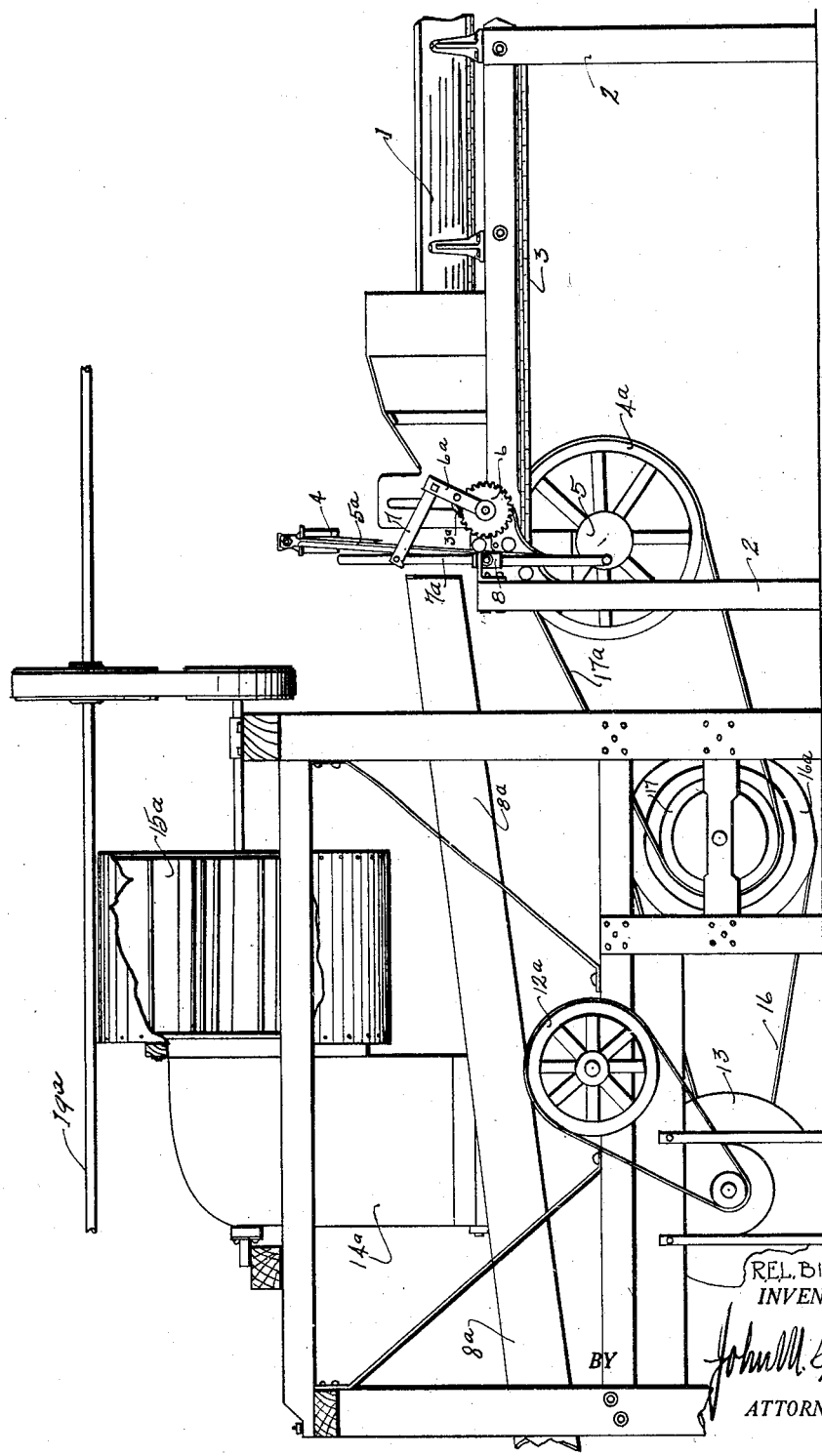

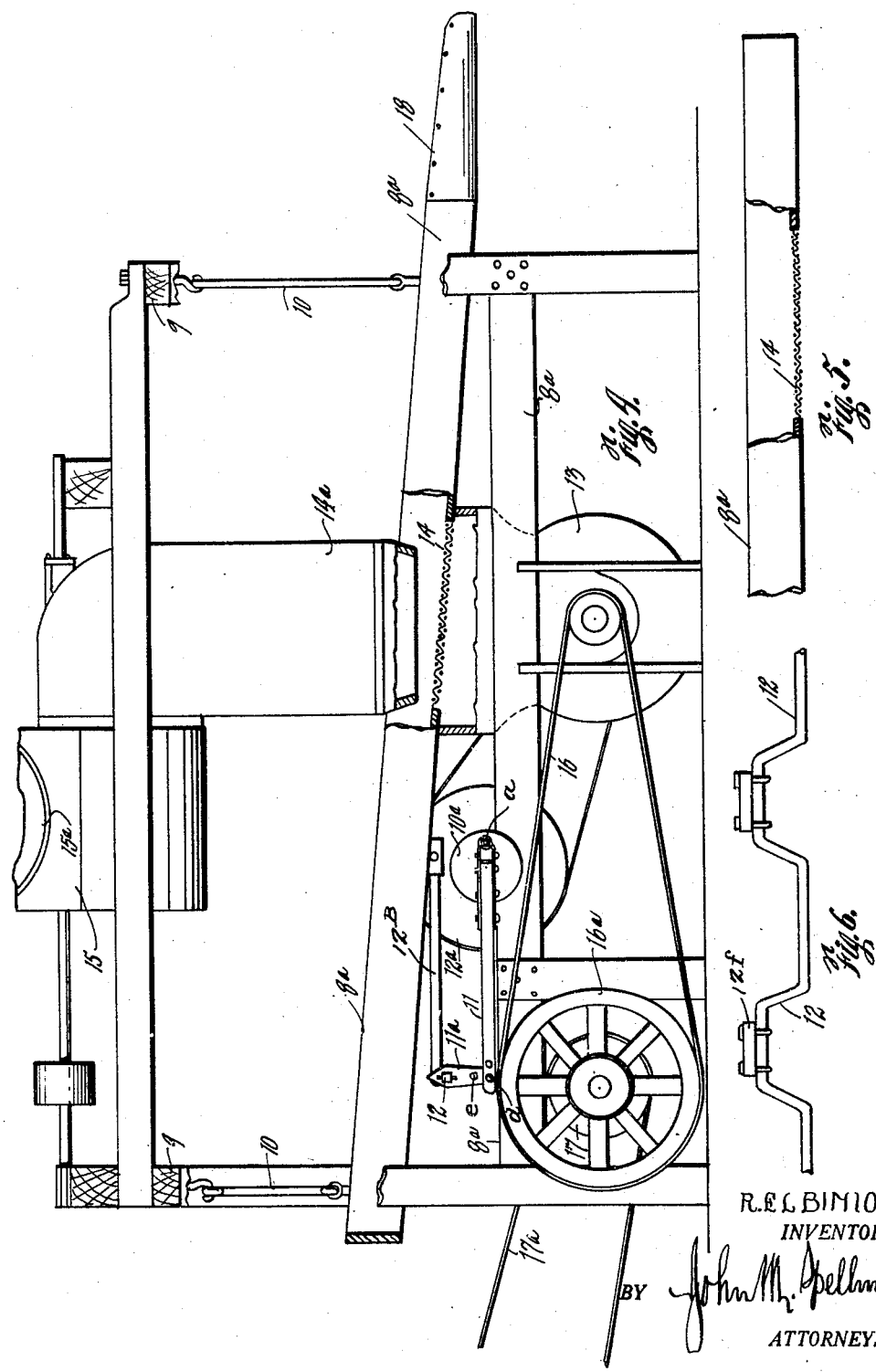

Patented Jan. 28, 1930

1,744,737

UNITED STATES PATENT OFFICE

ROBERT E. L. BINION, OF VAN ALSTYNE, TEXAS, ASSIGNOR OF ONE-HALF TO M. G. DAVIS, OF TRENTON, TEXAS

CANE-STRIPPING MACHINE

Application filed October 11, 1924. Serial No. 743,036.

This invention relates to cane stripping machinery and refers more particularly to a machine of this character which is so constructed as to completely prepare harvested cane for the mill.

Another object of the invention is the provision of a machine by which all duties in connection with the stripping and preparing of cane may be accomplished automatically, in a practical and efficient manner in a minimum of time, or in much less time than if the same was accomplished by hand.

Still another object is the provision of such a machine, by the use of which, much time is conserved in the preparing of the cane, also obviating the necessity of employing expensive labor for such purposes.

A feature of the invention lies in the combination of parts used in the assembling of the invention, and their function, to produce effectual and satisfactory results. Also the cane may be harvested for this stripper by an ordinary cane harvester or one row binder whereas heretofore such stripping and harvesting was accomplished only by hand in the field.

Another feature is apparent in the arrangement provided for the separation of the refuse, such as leaves and boot and other such matter from the cane joints after cutting.

Other objects, features and advantages will be set forth more fully as the description proceeds, as to the application and function of parts, constituting the operative mechanism of the invention taken in connection with the accompanying drawings forming a part of this specification: wherein, Figure 1 represents a side elevational view of the feeding and separating mechanism of the invention.

Figure 2 represents a continuation of Figure 1, illustrating an endless carrier belt, which is adapted to convey the commodity into the rollers.

Figure 3 is a side elevational view of said rollers.

Figure 4 represents a side elevational view of the separator, illustrating the novel agitator arrangement thereon.

Figure 5 represents a portion of the agitator conveyor, with a part cut away, illustrating the screened bottom therein.

Figure 6 represents a preferred multiple crank shaft which is adapted to furnish the necessary agitating means for the conveyor, separator.

Figure 7 is a view showing the corrugated surfaces of the rollers.

In carrying out the detailed description of the invention, similar characters of reference are employed to indicate various new and novel features of the invention and to describe more comprehensively their function wherein; 1 denotes a trough suitably supported on legs 2—2, in which the raw cane stalks are initially thrown. An endless link belt 3 operable longitudinally within this trough affords a continuous conveying means for the commodity. A suitable cutting means, consisting of a sheathed knife 4 is reciprocable perpendicularly at one end of the trough 1. This knife is adapted to operate to conform with the intermittent motion of the link belt 3. These two elements are controlled by the same mechanism, which mechanism is comprised of a main drive pulley, $4^a$, which is adapted to operate an eccentric disc 5. To this disc is secured a connecting rod $5^a$ which has its upper extremity pivoted to the knife 4, in order that the link belt 3 will conform with the reciprocating action of the knife. The same mechanism applies to the opposite side of the device, not shown.

A ratchet gear 6, rigidly secured to the shaft around which the link belt actuates, is provided with a short arm $6^a$, which arm is in turn pivotally secured to a second arm 7. This latter arm is in pivotal attachment to a lever $7^a$, the lower extremity of which lever pivotally engages the eccentric disc 5 at the same point as does the connecting rod $5^a$. The lever $7^a$ reciprocates through a stationary sleeve 8, which sleeve is rigidly secured upon the leg 2, in the position shown. At each revolution of the eccentric gear 5, a dog $3^a$ engages the ratchet gear 6, thereby retaining the tread belt $3^a$ at each new position taken, at which time the knife 4 severs a section of the cane.

After the cane is thus cut into sections, it then continues into the agitating conveyor 8ª, by gravity due to the inclined position of said conveyor. The construction and function of this conveyor is more clearly illustrated in Figure 4 of the drawings. It will be noted in this Figure that the conveyor is suspended from the frame supports 9—9 by suitable rods 10—10. The bottom of this conveyor is suitably screened as illustrated in Figures 4 and 6, and to facilitate the downward course of the commodity and to loosen the leaves and other substance from the stalks, an arrangement consisting of an eccentric disc 10ª to which pitman rod 11 is secured at point $a$, is provided. The other extremity of this pitman rod is pivotally engaged by an arm 11ª, a squared aperture in which latter member is adapted to conform with a squared portion on the end of a multiple crank shaft 12. To this shaft is secured a pair of pitman rods 12ᵇ, as shown in Figures 4 and 5 which are secured to the bottom of the conveyor or shaker 8ª. In order to diminish the reciprocating action of the shaker, the arm 11ª is provided with an additional aperture $c$ to which the pitman 11 may be secured through the apertures $d$ in the end thereof. The disc 10ª is operated by a band wheel 12ª, betted illustrated in Figure 1. This wheel obtains motive power from the encased fan pulley.

The shaft 12 is stationary with respect to the arm 11ª, and is extended from one side of the frame to the other. The oscillating movement imparted thereto by the pitman 11 provided for the proper reciprocation of the shaker 8ª.

The commodity, due to the agitation of the conveyor by the revolution of the eccentric disc 10ª, is shaken down the conveyor 8ª over the screened portion 14, clearly illustrated in Figure 6. As the commodity passes over the screened portion 14, all the loose leaves and other light particles of the stalks are blown upward through the pipe 14ª into the suction fan 15 and out through the pipe 15ª, thus leaving the cane joints comparatively clean, to continue through the rollers.

The intake end of the spout 14ª of the suction fan casing is suspended down within the conveyor 8ª directly above the foraminated section 14 thereof, whereby any loose leaves or other light undesirable parts of the cane laying upon the upper part of the stalks contained within the conveyor and directly below the spout 14ª will be drawn within said spout and finally discharged at a convenient place beside the apparatus. In order to cause the particles of the cane which are retained in the bottom part of the conveyor and covered by the stalks thereof to be brought to the top of the cane, a blower 13 is arranged below the conveyor having its discharge end positioned directly beneath the foraminated section 14, as is best illustrated in Figure 4 of the drawing. The continual agitation of the particles of cane as they pass over this foraminated section 14 which is caused by the movement transmitted to the conveyor, permits the lighter particles of fodder to be separated from the stalks and the blower will cause these lighter particles to be raised from the bottom of the conveyor whereas the suction fan 15 will convey these loose and lighter particles from the conveyor. It is to be also noted that the upper end of this conveyor is open whereby the cane section comprising the cut up pieces of stalks and fodder may be readily dropped within the conveyor and the swaying or jerking motion transmitted to the conveyor causes the mass of cane to pass downward toward the lower end thereof. This foraminated section 14 is relatively wide so that as the stalks and fodder pass thereover the entire mass is raised slightly by the combined application of the air under pressure by means of the blower and suction fan. While this entire mass of cane is raised slightly and subjected to the agitation of the conveyor, the lighter particles of the cane, insects, dirt and the like, are separated from the stalk, and the strong current of air passing therethrough carries these lighter particles therewith. This blower 13 comprises a rotatable fan provided with a main drive on the opposite end, comprised of a belt 16, operated by a pulley 16ª. Another pulley 17 centrally situated upon the same shaft, drives the band wheel 4ª through belt 17ª illustrated in the first figure.

After the sections of cane are thoroughly cleaned by the fan and blower, they are shaken down through the chute 18 and onto the elevator carrier 19 shown in Figure 2.

The entire machine is operated by a series of pulleys situated upon and driven by a main drive shaft 19ª shown in Figs. 1 and 2. This elevator carrier aforementioned obtains its motive power from this shaft through a chain and sprocket mechanism 20.

In order to more comprehensively disclose the operating mechanism of this elevator carrier and the crusher rollers, a side elevational view in Figure 3 has been provided, showing hopper 21, into which the cane is deposited prior to the initial crushing by the geared rollers 22 and 23. Below these rollers is situated a chute 22ª, down which the commodity passes, after first being crushed by the above rollers.

The following description is applied only to the cane mill and is not claimed as a part of the invention but is merely shown in order that a better understanding may be had regarding the utility and purpose of the invention.

A large gear wheel 23ª, operated indirectly from the main drive shaft, is adapted to impart the necessary motive power to these rollers, including a series of additional rollers having enmeshed gears and operable by the large gear 23ª.

It will be noted that this mechanism has been geared down very slow in order that the commodity will be completely and thoroughly crushed before the bagasse is finally passed out of the machine by suitable mechanism provided but not shown.

To further facilitate the crushing of the commodity, the rollers 22 and 23 are substantially corrugated as shown in Figure 7. After passing through these rollers, the bagasse is again thoroughly crushed between the additional rollers mentioned, the juice therefrom then passing into the mill adjacent the rollers.

It is the object, in view of the foregoing description to devise and provide a complete and thorough cane stripping machine, but it is not desired that the invention be limited to the specific disclosure herein and that minor changes in arrangement may be made as fall within the meaning and scope of the following claim.

I claim:

In a cane cleaning machine the combination with a supporting frame, of a trough to receive cane, an endless belt conveyer extending longitudinally and in the bottom of the trough, a reciprocating knife for cutting cane conveyed thereto by said conveyer, means to alternately reciprocate said knife and step forward said conveyer, said means comprising a disk, a connecting rod having its lower end eccentrically pivoted to said disk and having its upper end pivoted to said knife, an upwardly extending bar passing freely through a guide attached to said frame and having its lower end journaled on the same pivot with said lower end of said connecting rod, a pawl and ratchet for operating said conveyer belt, a link having one end pivoted to said bar near the upper end of said bar, an arm having its ends pivotally connected respectively with said ratchet and the free end of said link, said pawl being pivotally mounted on said arm adjacent said ratchet to engage said pawl to intermittently feed the cane on the conveyer to the knife synchronously with the reciprocation of said knife, and means to receive and separate the cane after having been cut in the proper lengths by said knife.

In testimony whereof I have signed my name to this specification.

ROBERT E. L. BINION.